UNITED STATES PATENT OFFICE.

EMIL RICHTER, OF DRESDEN, GERMANY.

FERTILIZER AND PROCESS OF MAKING SAME.

SPECIFICATION forming part of Letters Patent No. 658,021, dated September 18, 1900.

Application filed December 20, 1899. Serial No. 741,047. (No specimens.)

*To all whom it may concern:*

Be it known that I, EMIL RICHTER, a subject of the King of Saxony, residing at Dresden, Saxony, Empire of Germany, have invented a certain new and Improved Manufacture of Blood Products for Fertilizing, Alimentary, and other Purposes, (for which I have made application for Letters Patent in Germany, No. R. 13,573 IV/16, dated October 9, 1899; in Austria, dated November 18, 1899; in Hungary, No. 18,038, dated December 1, 1899; in Great Britain, No. 23,970, dated December 1, 1899, and in France, dated November 13, 1899,) of which the following is a specification.

The present invention relates to the manufacture of blood products in which the basic phosphates are transformed into superphosphates with soluble phosphoric acid. The product obtained in the form of a cake or concentrated mass is intended to be employed, preferably, when reduced to powder as a manure or fertilizer. As a powder or in blocks it may also be used for the alimentary purposes, while it may also be used for other purposes.

An important feature of the process is that evaporation of the blood does not form part of the process. Consequently the loss of valuable component parts is avoided, and owing to the manner in which the blood is transformed into a concentrated or dry substance the drawbacks connected with the older systems are overcome, which drawbacks could not be avoided, and in spite of the greatest care and the use of the best apparatus incrustation of the blood and the burning of the material took place.

The new manufacture is carried out in the following manner: The blood of the slaughtered animal is collected in a suitable manner, and in this natural state, as blood-water and thick blood, it is treated with a small quantity of titrated solution of sodium bisulphate up to one per cent. only of the quantity of blood. The sodium bisulphate is allowed to act on the mass, which is thoroughly mixed or stirred up every now and then until part of the sulphuric acid contained in the solution has withdrawn the alkali from the blood, which enters into combination with the sulphuric acid, forming sodium sulphate, (besides traces of potassium sulphate.) Owing to this treatment the blood-globules are hardened and lose tendency to change their form, while the said globules in their natural state cannot be detained by any known treatment, passing, as is well known, through any kind of filtering-cloth or the like, while they lose this characteristic owing to the reaction of the sulphate of sodium, whereby the whole possible quantity of valuable matter is obtained. The rest of the sodium bisulphate causes the phosphate to be converted into superphosphate. In the meanwhile the whole mass is heated, which can be done without causing any harm to the material by introducing steam. The object of this treatment is to produce concentration or coagulation of the liquid parts of the water and especially of the blood-water. Care should be taken that the heating should not be carried beyond a certain point, (80° to 90° centigrade,) so as to prevent the coagulated albuminous matter from becoming insoluble. During the treatment the mass is suitably stirred, so as to prevent its component parts from settling down in the order of their specific gravity and to produce a homogeneous mass. The result of this treatment is a cake or concentrated mass which may be cut with a knife, although still somewhat elastic to the touch, and inclosing mechanically only a small quantity of water. The mass is removed from the vessel, dried on a suitable frame or support, and can finally be pressed into shape or by means of cylinders or other means reduced to powder or small pieces.

This product has the great advantage that it retains all the phosphates contained in the blood in the form of easily-soluble phosphates. It is of importance when using it as a manure that the bases and acids contained in the powder and rendered by this process easily soluble, although separated from their solutions by the absorbing power of the soil, should still be sufficiently held by the substances of the manure-powder as not to be prematurely dissolved by atmospheric influences, so as to be carried too deeply into the ground. This manure-body is also a superior producer of humus or vegetable mold, and besides this advantage the material possesses the special quality that it admits of a great subdivision or dilution. The fact that the product contains all the protein substances in the purest and most soluble form renders it also a very valuable alimentary product.

What I claim as my invention, and desire to secure by Letters Patent, is—

1. The process of manufacturing a blood product for fertilizing, alimentary and other purposes, which consists in treating animal blood with sodium bisulphate and heating the mass; substantially as described.

2. The process of manufacturing a blood product for fertilizing alimentary and other purposes, which consists in treating animal blood with sodium bisulphate, heating the mass by the introduction of steam, and then drying it; substantially as described.

3. A blood product for fertilizing, alimentary and other purposes, consisting of animal blood and sodium bisulphate.

In testimony whereof I have signed my name to this specification in the presence of two subscribing witnesses.

EMIL RICHTER.

Witnesses:
OTTO WOLF,
C. J. HUGO DUMMER.